June 20, 1961 P. JOHANNSEN 2,989,300
SPRING ARRANGEMENT FOR VEHICLES
Filed March 4, 1958
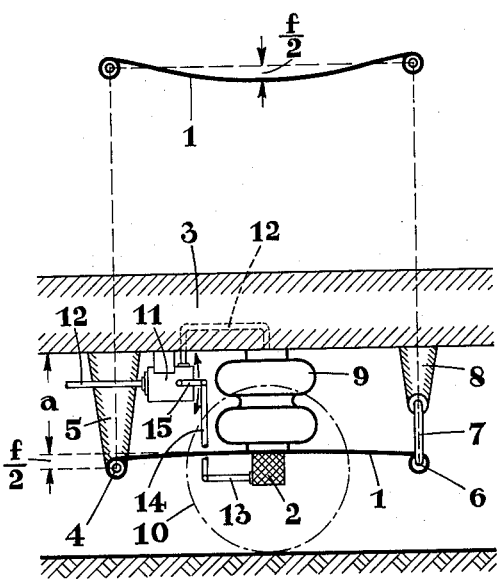
Fig. 1
Fig. 2
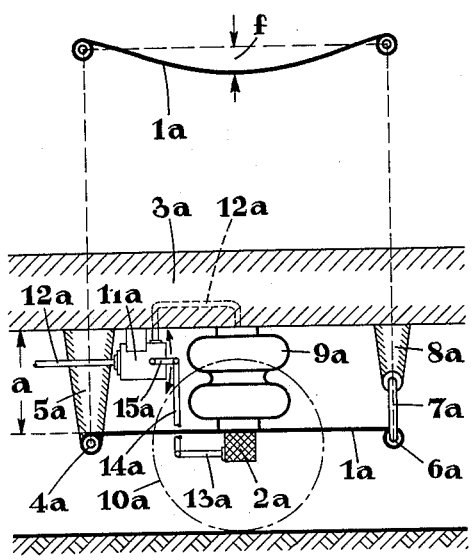
Fig. 3
Fig. 4
INVENTOR:
Peter Johannsen

United States Patent Office 2,989,300
Patented June 20, 1961

2,989,300
SPRING ARRANGEMENT FOR VEHICLES
Peter Johannsen, Hannover, Germany, assignor to Continental Gummi-Werke Aktiengesellschaft, Hannover, Germany
Filed Mar. 4, 1958, Ser. No. 719,140
Claims priority, application Germany Mar. 9, 1957
2 Claims. (Cl. 267—31)

The present invention relates to a spring arrangement for vehicles, according to which between the vehicle chassis and the respective vehicle wheel or axis thereof there is arranged an air spring with variable spring rate and also a leaf spring which latter serves for guiding the wheel.

Experience has shown that with such a spring arrangement, it is impossible to obtain a desired fundamental frequency of the vehicle independent of the load acting on the vehicle. While it is possible by varying the air pressure within the bellows of the air spring to vary the spring rate of said bellows which spring rate controls the fundamental frequency of the vehicle, it should be kept in mind that the spring rate of the leaf spring is constant which fact harmfully affects the fundamental frequency to be adjusted of the vehicle when the latter is under no load.

It is, therefore, an object of the present invention to provide a spring arrangement which will overcome the above mentioned drawback.

It is another object of this invention to provide a spring arrangement which will eliminate the harmful effect of the leaf spring with regard to the desired fundamental frequency of the vehicle when the latter is under no load.

These and other objects and advantages of the invention will appear more clearly from the following specification in connection with the accompanying drawing, in which:

FIG. 1 illustrates a side view of a not yet mounted leaf spring.

FIG. 2 illustrates a spring arrangement according to the invention with the leaf spring built in.

FIG. 3 shows a side view of a not yet mounted leaf spring curved somewhat different from that of FIG. 1.

FIG. 4 illustrates a spring arrangement according to the invention with the spring of FIG. 2.

The objects outlined above have been materialized according to the present invention by designing the leaf spring in such a way that when the vehicle is at its normal height the leaf spring is under such a pre-load or will be so pre-deflected that it will carry a portion of the wheel load. This pre-deflection is preferably so selected that the load absorbed by the leaf spring will not exceed the wheel load minus the useful load or service load.

Referring now to the drawing in detail, the leaf spring 1 or 1a each of which may consist of a plurality of leaves is so designed that already during its manufacture it is curved or pre-deflected to such an extent that the pre-deflection of spring 1 amounts to $$\frac{f}{2}$$

or the pre-deflection of spring 1a amounts to $f$.

According to FIG. 3, the leaf spring 1 which extends in the longitudinal direction of the vehicle to be equipped with the spring arrangement according to the invention, is connected in any customary manner with the wheel axle 2 and chassis 3. In other words, that spring eye 4 which when looking in the driving direction of the vehicle is located in the front is pivotally connected to a bracket or support 5 connected to the chassis 3, whereas the rear spring eye 6 is through the intervention of a link 7 pivotally connected with a rear bracket 8 of the chassis 3. Between the vehicle axle 2 and the chassis 3 there is arranged an air spring or air bellows 9 the ends of which are in a manner known per se fixedly connected with the chassis 3 and the axle 2 respectively. It is, of course, to be understood that, if desired, a plurality of bellows of any desired shape and for instance in parallel arrangement may be employed.

The air pressure within the bellows 9 may be varied in customary manner by control means such as a valve 11 in a feeding line 12 as it is customary in connection with air bellows. The air pressure in the bellows 9 is so adjusted that the distance $a$ will be maintained at different loads acting on the vehicle.

The leaf spring 1 is so installed that it can absorb a portion of the wheel load. In other words, the spring 1, when being installed, is pre-deflected. Thus, the spring 1 which prior to its installation is arched downwardly is installed in such a way that it will be arched upwardly by the amount of $$\frac{f}{2}$$

The wheel 10 indicated by a dot-dash circle will then be able to spring relatively upwardly while reducing the distance $a$ and to spring relatively downwardly by increasing the distance $a$.

With regard to FIG. 3, the parts illustrated therein and corresponding to those of FIG. 1 have been designated with the same reference numerals as in FIG. 1 but with the affix $a$.

As will be seen from FIG. 3, spring 1a which in non-installed condition is arched downwardly by the amount $f$, is so pre-deflected when being installed that the spring 1a in installed condition is substantially straight. Also in this instance, the wheel 10a can relatively spring upwardly by decreasing the distance $a$ and can relatively spring downwardly by increasing the distance $a$.

The arrangement according to the present invention is based substantially on the following considerations:

It is required that vehicles, especially vehicles for the transport of passengers as for instance busses have a fundamental or natural frequency which is independent of the load acting upon the respective vehicle. This fundamental or natural frequency $V$ is obtained from the formula $$V = \frac{1}{2\pi}\sqrt{\frac{gC}{G}}$$

The spring rate $C$ is found from the formula $$C_{\text{spring rate}} = C_{\text{air bellows}} + C_{\text{leaf spring}}$$

$C_{\text{air bellows}}$ is adapted to be varied in conformity with tne load by means of the fluid pressure control associated therewith. $C_{\text{leaf spring}}$, however, is constant so that this value will with varying vehicle weight $G$ disturb the condition $V=$ constant. For the above mentioned formula $G=$ acceleration due to gravity.

If the leaf spring 1a is pre-deflected by the amount $f$, $f$ being equal or approximately equal $$\frac{A}{V^2}$$

whereby $$A = \frac{g}{4\pi^2}$$

the theoretical fundamental frequency of leaf spring 1 as brought about by the pre-deflection and dependent thereon substantially equals the fundamental frequency of the air spring. It is now possible by varying the spring constant or spring factor of the air bellows 9 to adapt the same to the respective load so that at any load condition, the fundamental or natural frequencies of the leaf spring and the air bellows will substantially equal each other.

It may be mentioned that the control of the pressure fluid within the bellows 9 in such a way that the distance will be maintained, can be effected by an arm 13 fixed to the axle 2 and by a rod 14 engaging a lever 15 controlling the valve 11. If the load is raised, the fluid pressure will be raised too. If the vehicle will be unloaded, the valve 11 works like a bleeder valve. In order to prevent the control elements for the fluid pressure control to respond to a single short spring of the wheel 10 in one or the other direction, the control system may be equipped with time delaying means producing a time delay for instance of two seconds.

It is also to be mentioned that the springs 1 may be the only guiding means between the axle 2 and the chassis 3.

It is, of course, to be understood that the present invention is, by no means, limited to the particular constructions shown in the drawing but also comprises any modifications within the scope of the appended claims.

What I claim is:

1. In a spring system for a vehicle having a chassis and a wheel axle: an air spring having a variable spring rate and being interposed between said chassis and said wheel axle, and a leaf spring likewise interposed between said chassis and said vehicle axle, with said vehicle at its normal height said leaf spring being so deflected that the deflection of said leaf spring equals at least approximately $$\frac{A}{V^2}$$

wherein A equals $$\frac{g}{4\pi^2}$$

$g$ indicating the acceleration due to gravity, and $v$ indicating the desired natural frequency of the entire spring system.

2. A spring system according to claim 1, in which said leaf spring is so deflected that the load carried thereby at best equals the wheel load minus the pay load.

References Cited in the file of this patent

UNITED STATES PATENTS

| | | |
|---|---|---|
| 1,273,813 | Bernat | July 30, 1918 |
| 1,641,640 | Myers | Sept. 6, 1927 |
| 2,361,575 | Thompson | Oct. 31, 1944 |